United States Patent
Onoe et al.

(10) Patent No.: US 12,303,877 B2
(45) Date of Patent: May 20, 2025

(54) EXHAUST GAS PURIFICATION CATALYST

(71) Applicant: Cataler Corporation, Kakegawa (JP)

(72) Inventors: Ryota Onoe, Kakegawa (JP); Takahiro Noguchi, Kakegawa (JP); Tatsuya Ohashi, Kakegawa (JP); Kohei Takasaki, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 272 days.

(21) Appl. No.: 18/010,525

(22) PCT Filed: Jun. 4, 2021

(86) PCT No.: PCT/JP2021/021298
§ 371 (c)(1),
(2) Date: Dec. 15, 2022

(87) PCT Pub. No.: WO2021/261209
PCT Pub. Date: Dec. 30, 2021

(65) Prior Publication Data
US 2023/0302438 A1  Sep. 28, 2023

(30) Foreign Application Priority Data

Jun. 26, 2020 (JP) .................................. 2020-110654

(51) Int. Cl.
*B01J 21/04* (2006.01)
*B01D 53/94* (2006.01)
(Continued)

(52) U.S. Cl.
CPC .......... *B01J 35/19* (2024.01); *B01D 53/9468* (2013.01); *B01J 21/04* (2013.01); *B01J 23/10* (2013.01);
(Continued)

(58) Field of Classification Search
CPC ... B01J 21/04; B01J 23/10; B01J 23/44; B01J 23/464; B01J 23/58; B01J 35/19; B01J 35/613; F01N 3/2828; B01D 53/9468
(Continued)

(56) References Cited

U.S. PATENT DOCUMENTS

| | | | | |
|---|---|---|---|---|
| 5,945,369 A | * | 8/1999 | Kimura | B01D 53/945 502/325 |
| 7,276,212 B2 | * | 10/2007 | Hu | B01J 37/0244 422/177 |

(Continued)

FOREIGN PATENT DOCUMENTS

| | | |
|---|---|---|
| CN | 102407110 A | 4/2012 |
| CN | 103442804 A | 12/2013 |

(Continued)

OTHER PUBLICATIONS

Office Action in CN Application No. CN202180045738.8, dated May 16, 2024 (7 pages).

(Continued)

*Primary Examiner* — Cam N. Nguyen
(74) *Attorney, Agent, or Firm* — Occhiuti & Rohlicek LLP (57) ABSTRACT

According to a technique disclosed herein, provided is an exhaust gas purification catalyst, which both suppresses OSC when using a new vehicle and maintains OSC during life cycles. The exhaust gas purification catalyst disclosed herein is an exhaust gas purification catalyst includes a substrate, and a catalyst coated layer formed on the surface of the substrate, wherein the catalyst coated layer contains an OSC material having an oxygen storage capacity. The catalyst coated layer includes a Rh layer mainly containing Rh as a catalyst metal, and a Pd/Pt layer mainly containing Pd and/or Pt as a catalyst metal. At least a portion of the Pd/Pt layer in the catalyst coated layer contains, as the OSC (Continued)

material, a low specific surface area OSC material, including a ceria-zirconia composite oxide and having a specific surface area of 40 m²/g or more and 60 m²/g or less.

4 Claims, 4 Drawing Sheets

(51) Int. Cl.
  *B01J 23/10* (2006.01)
  *B01J 23/44* (2006.01)
  *B01J 23/46* (2006.01)
  *B01J 23/58* (2006.01)
  *B01J 35/00* (2006.01)
  *B01J 35/61* (2024.01)
  *F01N 3/28* (2006.01)

(52) U.S. Cl.
  CPC .............. *B01J 23/44* (2013.01); *B01J 23/464* (2013.01); *B01J 23/58* (2013.01); *B01J 35/613* (2024.01); *F01N 3/2828* (2013.01); B01D 2255/1021 (2013.01); B01D 2255/1023 (2013.01); B01D 2255/1025 (2013.01); B01D 2255/2042 (2013.01); B01D 2255/407 (2013.01); B01D 2255/9022 (2013.01); B01D 2255/908 (2013.01); B01D 2255/9207 (2013.01); B01D 2258/01 (2013.01); F01N 2330/06 (2013.01); F01N 2370/02 (2013.01)

(58) Field of Classification Search
  USPC .............. 502/304, 339, 349, 527.12, 327.13
  See application file for complete search history.

(56) References Cited

U.S. PATENT DOCUMENTS

| | | | | |
|---|---|---|---|---|
| 7,374,729 | B2* | 5/2008 | Chen | B01J 35/56 422/177 |
| 7,501,098 | B2* | 3/2009 | Chen | B01D 53/945 422/177 |
| 7,811,962 | B2* | 10/2010 | Hu | B01J 37/0244 502/304 |
| 8,796,172 | B2* | 8/2014 | Chinzei | B01D 53/945 502/262 |
| 8,853,120 | B2* | 10/2014 | Aoki | B01D 53/945 502/527.12 |
| 8,950,174 | B2* | 2/2015 | Hilgendorff | B01J 23/63 60/299 |
| 9,242,242 | B2* | 1/2016 | Hilgendorff | B01J 23/63 |
| 9,675,970 | B2* | 6/2017 | Matsueda | B01J 23/63 |
| 9,694,348 | B2* | 7/2017 | Hoshino | B01J 35/393 |
| 10,018,095 | B2* | 7/2018 | Nomura | B01D 53/94 |
| 10,071,368 | B2* | 9/2018 | Onoe | F01N 3/035 |
| 10,076,725 | B2* | 9/2018 | Onoe | B01D 53/94 |
| 10,125,649 | B2* | 11/2018 | Onoe | B01J 23/42 |
| 10,159,935 | B2* | 12/2018 | Onoe | B01D 53/945 |
| 10,183,253 | B2* | 1/2019 | Onoe | F01N 3/035 |
| 10,307,736 | B2* | 6/2019 | Saito | F01N 3/0814 |
| 10,344,655 | B2* | 7/2019 | Onoe | F01N 3/035 |
| 10,357,744 | B2* | 7/2019 | Ohashi | B01D 53/9472 |
| 10,408,102 | B2* | 9/2019 | Noguchi | B01J 21/08 |
| 10,413,885 | B2* | 9/2019 | Suzuki | B01J 35/56 |
| 10,556,223 | B2* | 2/2020 | Suzuki | F01N 3/101 |
| 10,576,420 | B2* | 3/2020 | Chinzei | B01J 35/30 |
| 10,688,476 | B2* | 6/2020 | Onoe | F01N 3/101 |
| 10,814,311 | B2* | 10/2020 | Hoshino | B01D 53/9472 |
| 10,960,389 | B2* | 3/2021 | Takesue | B01J 35/19 |
| 10,981,113 | B2* | 4/2021 | Onoe | F01N 3/101 |
| 11,110,435 | B2* | 9/2021 | Onoe | B01J 37/0248 |
| 11,201,805 | B2* | 12/2021 | Mueller | H04L 41/5012 |
| 11,420,189 | B2* | 8/2022 | Sawada | B01D 53/94 |
| 2006/0142151 | A1 | 6/2006 | Taki et al. | |
| 2011/0305615 | A1* | 12/2011 | Hilgendorff | B01J 37/0036 60/299 |
| 2012/0021899 | A1 | 1/2012 | Nobukawa et al. | |
| 2012/0055142 | A1* | 3/2012 | Hilgendorff | B01J 23/63 502/328 |
| 2014/0037524 | A1 | 2/2014 | Mikita et al. | |
| 2014/0369912 | A1* | 12/2014 | Zheng | B01J 35/23 502/439 |
| 2018/0304238 | A1* | 10/2018 | Saito | B01J 23/63 |
| 2019/0105637 | A1* | 4/2019 | Suzuki | B01J 23/44 |
| 2019/0126248 | A1 | 5/2019 | Chinzei et al. | |
| 2020/0276567 | A1* | 9/2020 | Onoe | B01J 35/19 |
| 2020/0290019 | A1 | 9/2020 | Onoe et al. | |
| 2020/0316579 | A1 | 10/2020 | Takesue et al. | |
| 2020/0340383 | A1* | 10/2020 | Tojo | F01N 3/28 |

FOREIGN PATENT DOCUMENTS

| | | |
|---|---|---|
| CN | 109153014 A | 1/2019 |
| EP | 2671638 A1 | 12/2013 |
| JP | 2006181476 A | 7/2006 |
| JP | 2014097459 A | 5/2014 |
| JP | 2019-084467 A | 6/2019 |
| WO | 2017159628 A1 | 9/2017 |
| WO | 2017204008 A1 | 11/2017 |

OTHER PUBLICATIONS

International Search Report, PCT Application No. PCT/JP2021/021298, mailed Aug. 24, 2021 (3 pages).
European Search Report issued in European Application No. 212830199.2 dated Sep. 28, 2023.
Office Action issued in Indian Application No. 202327002924 dated Oct. 10, 2023.

* cited by examiner

EXHAUST GAS PURIFICATION CATALYST

CROSS REFERENCE TO RELATED APPLICATIONS

This application is a U.S. national stage application of International Application no. PCT/JP2021/021298, filed Jun. 4, 2021, which claims the benefit of the filing date of JP Application No. 2020-110654, filed Jun. 26, 2020, the contents of which are hereby incorporated by reference in their entirety.

TECHNICAL FIELD

The present invention relates to an exhaust gas purification catalyst, and more particularly to an exhaust gas purification catalyst including a substrate and a catalyst coated layer formed on the surface of the substrate. This international application claims priority on Japanese Patent Application No. 2020-110654 filed on Jun. 26, 2020, the entire contents of which are incorporated herein by reference.

BACKGROUND ART

A three way catalyst including at least one of precious metal catalysts such as Pt (platinum), Pd (palladium) and Rh (rhodium) has been frequently used to purify exhaust gas such as HC (hydrocarbon), $NO_x$ and CO emitted from an internal combustion engine in e.g. automotive engines. In a typical constitution of the three way catalyst, a catalyst coated layer including alumina is formed on the surface of a high heat resistant ceramic substrate, and one or two or more precious metals such as Pt, Pd and Rh are supported by this catalyst coated layer. Harmful components in exhaust gas can be efficiently purified at a time by using Pt, Pd and Rh in combination.

In order to efficiently purify components in exhaust gas using such three way catalyst, the air/fuel ratio (A/F ratio), the mixing ratio of air and gasoline supplied to an engine, is desirably near a theoretical air/fuel ratio (stoich, i.e. 14.7). For the purpose of reducing the atmospheric fluctuations of the air/fuel ratio at which a catalyst can effectively work, a Ce-containing oxide (e.g. ceria-zirconia composite oxide) having an oxygen storage capacity (OSC) has been widely used as a carrier for the above precious metal until now (e.g. Patent Literatures 1 and 2). When the air/fuel ratio of exhaust gas is lean (i.e. an oxygen-excess atmosphere), the Ce-containing oxide occludes oxygen in exhaust gas, and when the air/fuel ratio of exhaust gas is rich (i.e. a fuel-excess atmosphere), the Ce-containing oxide releases the occluded oxygen. Because of this, even when the oxygen concentration in exhaust gas varies, the A/F control becomes easy, and stable performance of oxidation-reduction catalyst for exhaust gas can be obtained, and the exhaust gas purification performance of the three way catalyst is improved.

In recent years, an exhaust gas purification catalyst loaded on a vehicle has been demanded to have a better catalytic ability with tightening of emission control. In addition, an exhaust gas purification catalyst having higher durability has been demanded because the durable vehicle mileage is extended. In order to improve the durability of exhaust gas purification catalysts, Patent Literature 1 and Patent Literature 2, for example, disclose a method for adding a material having OSC (hereinafter, referred to as OSC material) in a certain place on a substrate.

CITATION LIST

Patent Literature

Patent Literature 1: Japanese Patent Application Publication No. 2014-97459
Patent Literature 2: Japanese Patent Application Publication No. 2006-181476

SUMMARY OF INVENTION

Technical Problem

Meanwhile, the amounts of the precious metal and OSC material used in a catalyst have currently been increased in many cases as a measure against tightening of emission control in recent years. In addition, Real Driving Emissions (RDE) control is introduced in Europe, and the method for testing the amount of exhaust gas is shifted from the driving test on a chassis dynamometer to the test of the actual measurement on public roads. Therefore, in order to purify exhaust gas emitted in the various driving states, and also from the viewpoint of extension of the durable vehicle mileage, the amounts of the precious metal and OSC material used tend to further increase.

However, the amount of an exhaust gas purification catalyst used cannot be increased without limitation. When the OSC is too great, changes in the oxygen content of exhaust gas become small particularly immediately after beginning to use a vehicle, and the air/fuel ratio learning and the on-board diagnosis (OBD) for oxygen after passing through an exhaust gas purification device may become difficult. An exhaust gas purification catalyst having excellent durability, which suppresses OSC when beginning to use a new vehicle, and also maintains desired OSC even after long-term use, has been demanded.

The present invention has been made in view of the above circumstances, and an object thereof is to provide an exhaust gas purification catalyst, which both suppresses OSC to a proper level when beginning to use a vehicle having the catalyst, and maintains OSC during life cycles (long-term use).

Solution to Problem

The present inventors found that by setting the specific surface area (which herein indicates a specific surface area measured by the BET method. The same applies hereinafter) of an OSC material including a ceria-zirconia composite oxide to a predetermined range, which is smaller than that used in conventional exhaust gas purification catalysts of this type, the OSC amount when beginning to use the OSC material (hereinafter, referred to as initial OSC amount) could be effectively suppressed to a proper level. It was further found that in such OSC material, the rate of reduction in the OSC amount after long-term use (hereinafter, referred to as OSC amount after durability) could be suppressed compared to that of conventional OSC materials having relatively higher initial OSC amounts.

That is, the exhaust gas purification catalyst provided by the present invention includes a substrate and a catalyst coated layer formed on the surface of the substrate. The catalyst coated layer contains an OSC material having an oxygen storage capacity, and the catalyst coated layer includes a Rh layer mainly containing Rh as a catalyst metal, and a Pd/Pt layer mainly containing Pd and/or Pt as a catalyst metal. At least a portion of the Pd/Pt layer in the catalyst coated layer contains, as the OSC material, a low specific surface area OSC material, including a ceria-zirconia composite oxide and having a specific surface area of 40 m²/g or more and 60 m²/g or less.

In the exhaust gas purification catalyst having such constitution, when the specific surface area of an OSC material included is adjusted to the above predetermined range, the initial OSC amount can be properly suppressed, and a reduction in the OSC amount after long-term use, i.e. after durability can be also suppressed, and the OSC retention rate (which indicates the proportion of the OSC amount after durability to the initial OSC amount under certain conditions, expressed as a percentage. The same applies thereinafter) can be high compared to that of conventional cases. Therefore, a proper A/F control can be achieved over a long period of time using the exhaust gas purification catalyst having such constitution.

In a preferred aspect of the exhaust gas purification catalyst disclosed herein, the catalyst coated layer includes a lower layer formed on the substrate, and an upper layer formed on the lower layer, and one layer of the upper layer and the lower layer constitutes the Rh layer, and the other layer constitutes the Pd/Pt layer.

According to the exhaust gas purification catalyst having such constitution, a proper A/F control can be achieved over a long period of time, and also desired exhaust gas purification performance particularly in the Pd/Pt layer can be retained over a long period of time.

In the above constitution, the lower layer preferably constitutes the Pd/Pt layer.

According to such constitution, desired exhaust gas purification performance in the Pd/Pt layer can be particularly suitably shown.

In a preferred aspect of the exhaust gas purification catalyst disclosed herein, the catalyst coated layer includes a front part placed on the upstream side in the exhaust gas inflow direction, and a rear part placed on the downstream side, wherein the front part is formed from the end on the exhaust gas inflow side of the substrate towards the exhaust gas outflow side, and the rear part is formed from the end on the exhaust gas outflow side of the substrate towards the exhaust gas inflow side. The front part and the rear part partly overlap with each other so that, when the total length of the substrate in the exhaust gas flow direction is $L_w$, the length $L_1$ of the front part meet $0.3 \times L_w \leq L_1 \leq 0.7 \times L_w$, the length $L_2$ of the rear part meet $0.5 \times L_w \leq L_2 \leq 0.85 \times L_w$, and $(L_1+L_2) \geq 1.05 \times L_w$ is met. The amount of the low specific surface area OSC material (g/L) with respect to the capacity of the substrate (L) in the front part is 40 g/L or less, and the amount of the low specific surface area OSC material (g/L) with respect to the capacity of the substrate (L) in the rear part is 1.2 times or more higher than the amount of the low specific surface area OSC material (g/L) in the front part.

In the exhaust gas purification catalyst having such constitution, the front part and the rear part are divided as above, and the low specific surface area OSC material is arranged to the rear part. Both reducing the initial OSC amount and maintaining the OSC amount after durability can be suitably achieved by adding the OSC material as described above.

In a preferred aspect of the exhaust gas purification catalyst disclosed herein, the low specific surface area OSC material includes metallic elements described below in proportions described below as mole percentages:

15% or more and 55% or less of Ce,
40% or more and 80% or less of Zr,
1% or more and 10% or less of Pr,
0% or more and 10% or less of La, and
0% or more and 10% or less of Y.

Such constitution includes Pr in a proportion of 1 mol % or more and 10 mol % or less of all metallic elements. Because of this, catalytic activity in a lower temperature range (about 200 to 400° C.) can be improved.

In the description, "includes something in 0% or more and 10% or less" means "it may not be included, and, when included, it is included in 10% or less". It should be noted that the proportions of metallic elements other than the above metallic elements are not limited.

DESCRIPTION OF EMBODIMENTS

A suitable embodiment of the exhaust gas purification catalyst disclosed herein will now be described with reference to the drawings. The following embodiment is of course not intended to particularly limit the technique disclosed herein. Matters other than those particularly mentioned herein (e.g., the composition of a porous carrier) and necessary to carry out the present invention (e.g., general matters concerning the location of an exhaust gas purification catalyst) are recognizable as matters to be designed by a person skilled in the art on the basis of technologies known in the art. The present invention can be carried out on the basis of the description disclosed herein and common technical knowledge in the art.

As used herein, the term A to B indicating a range of values (A and B are optional values) means A or more and B or less.

In the following drawings, members and parts having the same action have the same signs, and overlapping descriptions may be omitted or simplified. In addition, sizes in the following drawings (e.g. length, thickness, width) do not necessarily show actual sizes, and do not limit the constitution of the exhaust gas purification catalyst in any way.

The exhaust gas purification catalyst disclosed herein includes a substrate and a catalyst coated layer formed on the inner surface of the substrate, and the catalyst coated layer is formed into a single layer structure or a laminate structure.

Figure 1:
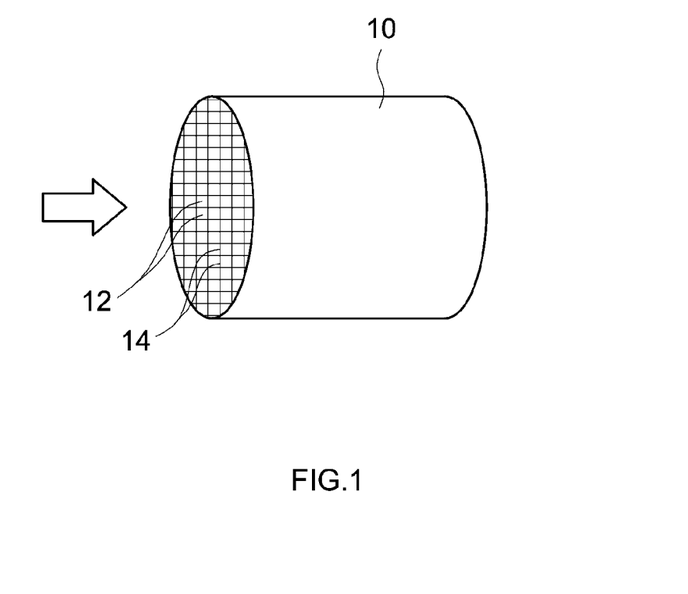
FIG. 1 is a schematic diagram showing the structure of the substrate in the exhaust gas purification catalyst according to one embodiment.

FIG. 1 is a schematic diagram showing the structure of the substrate in the exhaust gas purification catalyst according to one embodiment. The exhaust gas purification catalyst 100 according to one embodiment has regularly arranged cells 12 and a substrate 10 having rib walls 14 which form the cells 12.

As the above substrate 10 forming the exhaust gas purification catalyst 100, those from various materials and in various forms conventionally used for this type of application can be used. For example, a honeycomb substrate having a honeycomb structure formed from ceramic such as cordierite or silicon carbide (SiC), or an alloy (e.g. stainless) can be suitably used. As an example, a honeycomb substrate in a cylindrical form as an external form is provided, in which through-holes (cells) are provided as exhaust channels in the direction of the cylindrical axis, and exhaust gas can touch walls (rib walls) dividing cells. In addition, as the whole external form of the substrate, an elliptic cylinder and polygonal cylinder may be used in place of the cylindrical form. It should be noted that the volume (capacity) of the substrate 10 herein indicates bulk capacity including the net capacity of the substrate and the void capacity in the inside. That is, the volume (capacity) of the substrate 10 includes the catalyst coated layer formed in the voids.

Figure 2:
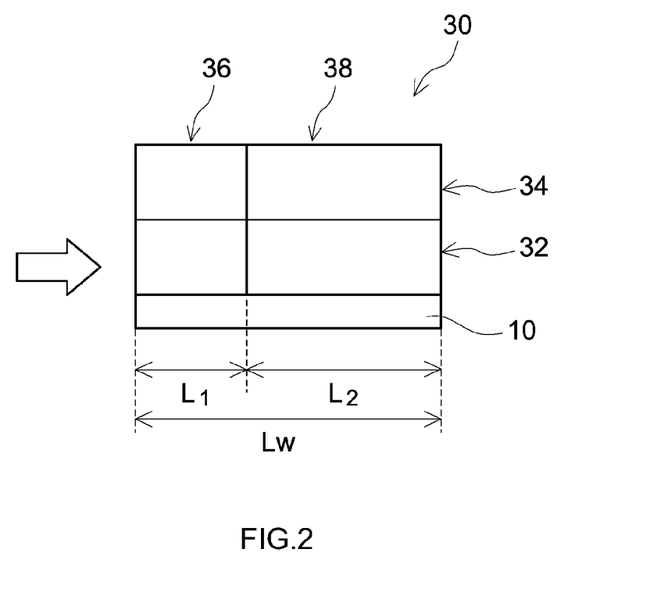
FIG. 2 is a schematic diagram showing the constitution of the catalyst coated layer according to one embodiment.

FIG. 2 is a schematic diagram showing the constitution of the catalyst coated layer according to one embodiment.

The catalyst coated layer 30 may have the lower layer 32 formed on the substrate 10 and the upper layer 34 formed on the lower layer 32. In addition, the catalyst coated layer 30 may have the front part 36 formed from the end on the exhaust gas inflow side of the substrate 10 towards the exhaust gas outflow side, and the rear part 38 formed from the end on the exhaust gas outflow side of the substrate 10 towards the exhaust gas inflow side.

When the catalyst coated layer 30 has the lower layer 32, the upper layer 34, the front part 36 and the rear part 38, the front part included in the upper layer 34 is referred to as the front part of the upper layer, the rear part included in the upper layer 34 is referred to as the rear part of the upper layer, the front part included in the lower layer 32 is referred to as the front part of the lower layer, and the rear part included in the lower layer 32 is referred to as the rear part of the lower layer.

The catalyst coated layer 30 has catalyst metals and an OSC material. The catalyst coated layer 30 includes a Rh layer mainly containing Rh as the catalyst metal, and a Pd/Pt layer mainly containing Pd and/or Pt.

It should be noted that the layers forming the catalyst coated layer 30 are not limited to the Rh layer and the Pd/Pt layer, and the catalyst coated layer 30 may have a layer other than the layers. In addition, the number of layers in each layer is not limited to one.

In the present application, "mainly" means a catalyst metal having the largest mass among the layers included in the catalyst coated layer. The catalyst metal mainly contained can account for, but not necessarily limited to, commonly 75 mass % or more of catalyst metals included in layers forming the catalyst coated layer, preferably 80 mass % or more, more preferably 90 mass % or more, and particularly preferably 95 mass % or more, for example, 98 mass % or more.

The amount of catalyst metal contained in the catalyst coated layer is not particularly limited, and is commonly 2.5 g/L or more per L of the capacity of the substrate, preferably 3.5 g/L or more, more preferably 4.5 g/L or more, and also commonly 10 g/L or less, preferably 8 g/L or less, and more preferably 7 g/L or less.

The catalyst coated layer may include precious metal other than Rh, Pd and Pt, such as Ru, Ir and Os, without losing the effect of the present invention.

The OSC material disclosed herein may be a material having an oxygen storage capacity such as $CeO_2$ or a ceria-zirconia composite oxide, and a material including a ceria-zirconia composite oxide is preferably used. The mixing proportion of ceria in the ceria-zirconia composite oxide is commonly 0.1 to 0.9, preferably 0.25 to 0.75, and more preferably about 0.25.

At least a portion of the Pd/Pt layer is characterized by including, as the OSC material, a low specific surface area OSC material having a specific surface area of 40 to 60 $m^2/g$. This value is low compared to the value of specific surface area of OSC materials which have been conventionally used (about 70 to 100 $m^2/g$).

It should be noted that the low specific surface area OSC material herein indicates an OSC material having a specific surface area of 40 to 60 $m^2/g$, and a conventional OSC material indicates an OSC material having a specific surface area of higher than 60 $m^2/g$.

The low specific surface area OSC material is produced by burning a material forming an OSC material such as a ceria-zirconia composite oxide at a high temperature for a certain time. For example, the specific surface area of an OSC material can be adjusted to about 40 to 60 $m^2/g$ by heating a material forming the OSC material at 800° C. or higher for an hour or more. When the specific surface area is low compared to that of conventional OSC materials, the initial OSC amount can be properly suppressed and the OSC retention rate can be higher than before. The burning temperature and burning time can be appropriately set depending on a desired initial OSC amount and OSC retention rate, and commonly the OSC material can be properly adjusted by heating a material forming the OSC material at 800 to 1200° C. for 0.1 to 10 hours, for example, at 900 to 1100° C. for 1 to 5 hours.

The reason why such effect is obtained is considered as follows.

Figure 3:
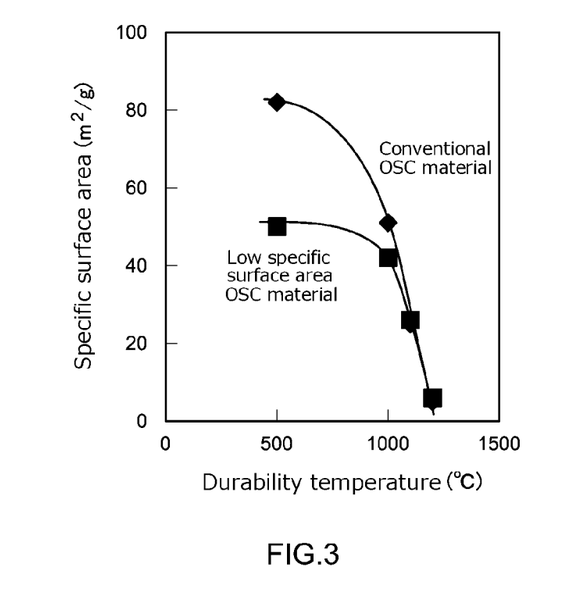
FIG. 3 is a graph showing a relationship between the durability temperature and the specific surface area of an OSC material.

FIG. 3 is a graph showing a relationship between the durability temperature and the specific surface area of an OSC material. In a low specific surface area OSC material, the initial specific surface area is low compared to that of a conventional OSC material, and thus the initial OSC amount is low; however, the low specific surface area OSC material and the conventional OSC material have nearly equal specific surface areas after durability, and also have nearly equal OSC amounts after durability.

Because of this reason, compared to when the amount of a conventional OSC material with respect to the catalyst coated layer is increased, when the amount of a low specific surface area OSC material contained is increased, the initial OSC amount of the whole exhaust gas purification catalyst can be low, and by an increase in the amount of the OSC material, the OSC amount after durability of the whole exhaust gas purification catalyst can be maintained.

As described above, because the specific surface area of a low specific surface area OSC material is not easily reduced, the grain growth of catalyst metals is suppressed, and because of this, the deterioration of catalytic ability can be also suppressed. For example, by adding a low specific surface area OSC material to the Pd/Pt layer including Pd and/or Pt, which easily causes grain growth compared to Rh, the deterioration of catalytic ability of the Pd/Pt can be suitably suppressed.

It should be noted that the OSC material contained in the catalyst coated layer is not limited to the low specific surface area OSC material disclosed herein, and a conventional OSC material may be contained. The catalyst coated layer may contain, but not particularly limited to, only the low specific surface area OSC material, or both the low specific surface area OSC material and a conventional OSC material. In addition, the amounts of the low specific surface area OSC material and conventional OSC material may be changed depending on layers forming the catalyst coated layer and parts of the layers (e.g. the front part and the rear part), and a layer not containing a low specific surface area OSC material may be provided.

The amount of the OSC material (ceria-zirconia composite oxide) contained in the catalyst coated layer is not particularly restricted, and the amount of $CeO_2$ in the ceria-zirconia composite oxide is commonly 5 g/L or more per L of the capacity of the substrate, preferably 10 g/L or more, and also commonly 50 g/L or less, and preferably 40 g/L or less.

The OSC material may include a compound other than the ceria-zirconia composite oxide to an extent at which the performance thereof is not lost, for example, for the purpose of suppressing sintering and improving durability. Examples of such compound include rare earth oxides such as $La_2O_3$, $Y_2O_3$ and $Pr_6O_{11}$, alkali metal oxides, alkaline earth metal oxides such as BaO, transition metal, metal oxides such as $Al_2O_3$, alkali metal, alkaline earth metal, rare earth metal, a polycrystalline body such as $SiO_2$ or monocrystal.

Among these, a porous metal oxide having good heat resistance is suitably used as a carrier to support a metal catalyst. Among these, $Al_2O_3$ having good heat resistance can be used to improve the heat stability of the whole catalyst.

In one suitable embodiment of the technique disclosed herein, the low specific surface area OSC material is characterized by including, in mole percentage, 15% to 55% of Ce, 40 to 80% of Zr, 1 to 10% of Pr, 0 to 10% of La, and 0 to 10% of Y. The above metallic elements are included as, for example, $CeO_2$, $ZrO_2$, $Pr_6O_{11}$, $La_2O_3$ and $Y_2O_3$. The low specific surface area OSC material preferably includes 2 to 7% of Pr.

The reason why such effect is obtained is considered as follows. When HC included in exhaust gas is decomposed in an exhaust gas purification catalyst, Pd easily causes hydrogen absorption with heat generation at about 200 to 400° C., and catalytic activity can be reduced. By adding an OSC material containing e.g. $Pr_6O_{11}$, $La_2O_3$, $Y_2O_3$, catalytic activity can be suitably improved even in the above temperature range.

In one embodiment disclosed herein, the catalyst coated layer 30 includes the lower layer 32 formed on the substrate 10, and the upper layer 34 formed on the lower layer 32. One layer of the upper layer 34 and the lower layer 32 constitutes a Rh layer, and the other layer constitutes a Pd/Pt layer. The low specific surface area OSC is included in at least a part of an OSC material forming the Pd/Pt layer. By such constitution, the initial OSC amount can be properly adjusted, and the OSC retention rate can be raised.

In addition, in one embodiment, the lower layer constitutes the Pd/Pt layer. By such constitution, desired exhaust gas purification performance can be particularly suitably shown in the Pd/Pt layer.

In one embodiment disclosed herein, the catalyst coated layer 30 has the front part 36 placed on the upstream side in the exhaust gas inflow direction, and the rear part 38 placed on the downstream side.

When the total length of the substrate in the exhaust gas flow direction 10 is $L_w$, the length $L_1$ of the front part 36 is $0.3 \times L_w$ or more and also $0.7 \times L_w$ or less. The length $L_2$ of the rear part 38 is $0.85 \times L_w$ or less and also $0.5 \times L_w$ or more. Furthermore, the front part 36 and the rear part 38 partly overlap with each other, and the overlapped length is $0.05 \times L_w$ or more, preferably $0.2 \times L_w$ or more, and more preferably $0.4 \times L_w$ or more.

The amount of the low specific surface area OSC material forming the front part 36 is 40 g/L or less per L of the capacity of the substrate, and the amount of the low specific surface area OSC material forming the rear part 38 is commonly higher than or equal to the amount of the low specific surface area OSC material forming the front part 36, and preferably 1.2 times or more, for example, 1.5 times or more.

The reason why such effect is obtained is because the OSC material of the front part is used earlier than the OSC material of the rear part. The OSC material of the front part particularly when beginning to use an exhaust gas purification catalyst highly contributes to the whole OSC amount. That is, the initial OSC amount can be kept low when the amount of the OSC material used in the front part is smaller than the amount in the rear part.

However, a case where the OSC material is not used for the front part at all is not preferred from the viewpoint of warm up characteristics, i.e. a catalytic ability in the state in which the temperature of the exhaust gas purification catalyst is not warm. The amount of the OSC material included in the front part is preferably more than 0 g/L, for example, 1 g/L or more, more preferably 10 g/L or more, and also preferably 60/Lg or less, and more preferably 40 g/L or less.

The catalyst coated layer 30 can be formed by a known method. For example, first, each slurry is prepared for each layer forming the catalyst coated layer 30. In the slurry, a catalyst metal, an OSC material and other constituents, contained in each layer, are included. Each layer is formed upward from the substrate using the prepared slurry by washcoating, drying and burning of each layer forming the catalyst coated layer.

The drying conditions of the washcoat slurry depend on the form and size of the substrate or carrier, and are typically at about 80 to 300° C. (for example 100 to 250° C.) for about one to 10 hours. The burning conditions vary depending on the intended specific surface area of an OSC material, and are at about 400 to 1200° C. for about 0.1 to 10 hours, for example, at about 400 to 1000° C. for about one to 4 hours. It should be noted that in a process of forming the catalyst coated layer 30 by washcoating, a binder may be contained in a slurry in order that the slurry will adequately adhere to the substrate. As the binder, for example, alumina sol, silica sol or the like is preferably used. The viscosity of the slurry may be properly adjusted so that the slurry can easily flow into the cells of the substrate.

In the exhaust gas purification catalyst 100 disclosed herein, the initial OSC amount is properly adjusted, and a reduction in the OSC amount after durability is also suppressed, and the OSC retention rate can be higher than before. The exhaust gas purification catalyst 100 can be used for various applications, and can be suitably used, for example, as an exhaust gas purification catalyst loaded on vehicles.

Suitable embodiments will now be described by way of examples thereof. It should be noted, however, that the present invention is not intended to be limited to the examples.

Test Substrate

A honeycomb substrate in a cylindrical form made of cordierite with a total length of 110 mm and a substrate capacity of 1.3 L was prepared. In the tests below, the honeycomb substrate was used as a test substrate.

PRODUCTION OF TEST EXHAUST GAS PURIFICATION CATALYST

Example 1

As shown in Table 1, a ceria-zirconia composite oxide, $Al_2O_3$ powder, Rh nitrate and water were mixed so that the amount of materials coated with respect to the capacity of the test substrate was the ceria-zirconia composite oxide: 50 g/L (in which ceria was 10 g/L), $Al_2O_3$: 50 g/L, BaO: 10 g/L and Pd: 2 g/L to prepare slurry 1-Pd. In addition, as shown in Table 1, a ceria-zirconia composite oxide, $Al_2O_3$ powder, BaO powder, Pd nitrate and water were mixed so that the amount of materials coated with respect to the capacity of the test substrate was the ceria-zirconia composite oxide: 25 g/L (in which ceria was 5 g/L), $Al_2O_3$: 25 g/L and Rh: 0.2 g/L to prepare slurry 1-Rh.

The slurry 1-Pd was washcoated to 100% of the length of the substrate from the end on the exhaust gas inflow side of the catalyst coated layer towards the downstream side, and from the end on the exhaust gas outflow side towards the upstream side. After drying at 250° C. for an hour, burning was carried out at 900° C. for 3 hours to form a lower layer. Next, the slurry 1-Rh was washcoated on the lower layer formed on the test substrate to 100% of the length of the substrate from the end on the exhaust gas inflow side towards the downstream side, and from the end on the exhaust gas outflow side towards the upstream side. After drying at 250° C. for an hour, burning was carried out at 500° C. for an hour to form an upper layer on the lower layer, and an exhaust gas purification catalyst example 1 was produced.

Example 2

An exhaust gas purification catalyst example 2 was produced in the same manner as in Example 1 except that the burning temperature of the slurry 1-Pd was changed to 500° C.

Example 3

Materials and water were mixed so that the amount of materials coated on the test substrate was the coating amount shown in Table 1 to prepare slurry 3-Pd.

An exhaust gas purification catalyst example 3 was produced in the same manner as in Example 1 except that the slurry 3-Pd was used in place of the slurry 1-Pd.

Example 4

Materials and water were mixed so that the amount of materials coated on the test substrate was the coating amount shown in Table 2 to prepare slurry 4-F and slurry 4-R.

In order to form the front part of the lower layer, the slurry 4-F was washcoated to 70% of the length of the substrate from the end on the exhaust gas inflow side of the test substrate towards the downstream side so that ceria-zirconia oxide was coated in an amount shown in Table 2 per L of the capacity of the coated width. In order to form the rear part of the lower layer, the slurry 4-R was washcoated to 75% of the length of the substrate from the end on the exhaust gas outflow side of the test substrate towards the upstream side so that ceria-zirconia oxide was coated at 50 g/L per L of the capacity of the coated width. After drying at 250° C. for an hour, burning was carried out at 900° C. for 3 hours to form a lower layer having the front part and the rear part. Furthermore, the upper layer was formed using the slurry 1-Rh in the same manner as in Example 1 to produce an exhaust gas purification catalyst example 4.

Examples 5 to 9

Materials and water were mixed so that the amount of materials coated on the test substrate was the coating amount shown in Table 2 to prepare slurry 5-F to 9-F. Exhaust gas purification catalyst examples 5 to 9 were produced in the same manner as in Example 4.

TABLE 1

| Exhaust gas purification catalyst | | Example 1 | | Example 2 | | Example 3 | |
|---|---|---|---|---|---|---|---|
| | Layer | Upper layer | Lower layer | Upper layer | Lower layer | Upper layer | Lower layer |
| | Slurry | 1-Rh | 1-Pd | — | — | — | 3-Pd |
| Coating amount (g/L) | CZ | 25 | 50 | 1-Rh was used | 1-Pd was used | 1-Rh was used | 50 |
| | (C) *1 | (5) | (10) | | | | (10) |
| | $Pr_{11}O_6$ | — | — | | | | 3 |
| | $La_2O_3$ | | | | | | 1 |
| | $Y_2O_3$ | | | | | | 1 |
| | $Al_2O_3$ | 25 | 50 | | | | 50 |
| | BaO | — | 10 | | | | 10 |
| | Rh | 0.2 | — | | | | — |
| | Pd | — | 2 | | | | 2 |
| Burning temperature (° C.) | | 500 | 900 | 500 | 500 | 500 | 900 |
| Burning time (hour) | | 1 | 3 | 1 | 1 | 1 | 3 |

*1 CZ (C): amount of ceria-zirconia composite oxide included (amount of ceria included)

TABLE 2

| Exhaust gas purification catalyst | | Examples 4 to 9 | Example 4 | Example 5 | Example 6 | Example 7 | Example 8 | Example 9 | Examples 4 to 9 |
|---|---|---|---|---|---|---|---|---|---|
| Layer/part | | Upper layer | Front part of lower layer | | | | | | Rear part of lower layer |
| Slurry | | — | 4-F | 5-F | 6-F | 7-F | 8-F | 9-F | 4-R |
| Coating amount (g/L) | CZ (C) *1 | 1-Rh was used | 0 | 10 | 20 | 30 | 40 | 60 | 50 |
| | | | (0) | (4) | (8) | (12) | (16) | (24) | (20) |
| | Al$_2$O$_3$ | | 90 | 80 | 70 | 60 | 50 | 40 | 50 |
| | BaO | | | | | 5 | | | 5 |
| | Rh | | | | | — | | | |
| | Pd | | | | | 2 | | | 2 |
| Burning temperature (° C.) | | 500 | | | | 900 | | | |
| Burning time (hour) | | 1 | | | | 3 | | | |

Evaluations of OSC

The OSC amount in an exhaust gas purification catalyst was evaluated as follows. First, an exhaust gas purification catalyst was put in an engine exhaust system, and a downstream O$_2$ sensor for the exhaust gas purification catalyst was further put therein. Then, the OSC of the exhaust gas purification catalyst was calculated from the delayed behavior of the O$_2$ sensor while periodically switching the air/fuel ratio of mixed gas supplied to the engine between rich and lean at predetermined time intervals.

Durability Test 1

The durability test was carried out on the exhaust gas purification catalyst example 1 and example 2, and the OSC retention rates were compared between a case where a low specific surface area OSC material was contained in the Pd layer (Example 1) and a case where a conventional OSC material was contained (Example 2) by the comparison of the OSC amounts before and after durability. The exhaust gas purification catalyst example 1 and example 2 were each set in a V-type engine exhaust system with an engine displacement of 4 L, the engine was operated, and the durability test 1 was carried out at a catalyst temperature of 950° C. for 150 hours. It should be noted that the conditions of the durability test correspond to a vehicle mileage of about 200000 km.

Figure 4:
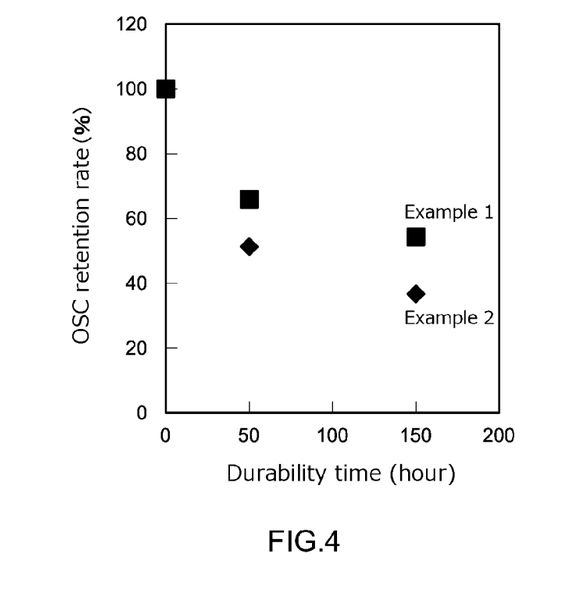
FIG. 4 is a graph showing a relationship between the durability time and the OSC retention rate.

As shown in FIG. 4, the OSC retention rate after durability for 150 hours was 50% or more in a case where a low specific surface area OSC material was contained (Example 1), and contrarily 40% or less in a case where a conventional OSC material was contained (Example 2). It was verified that a reduction in the OSC retention rate was suppressed by adding a low specific surface area OSC material to the Pd layer.

Test of CO Purification Rate

The test of the CO purification rate was carried out on the exhaust gas purification catalyst example 2 and example 3. The CO purification rate was measured using a fixed bed flow reactor. A heat exchanger and a catalyst were placed in an engine exhaust system, and while increasing the temperature from 100° C. to 500° C. at 10° C./min, the CO concentration at the catalyst inlet and catalyst outlet was measured, and the CO purification rate was calculated.

Figure 5:
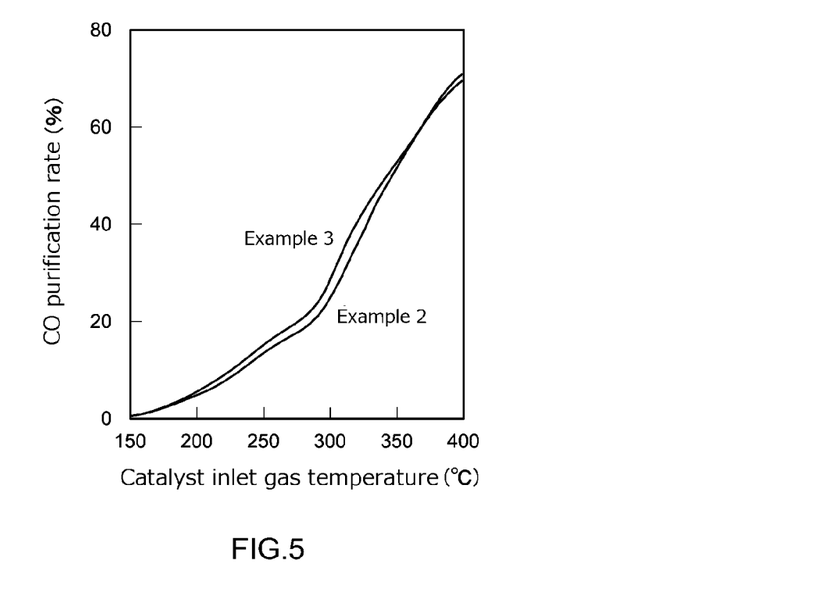
FIG. 5 is a graph showing a relationship between the catalyst inlet gas temperature and the CO purification rate.

As shown in FIG. 5, in the exhaust gas purification catalyst example 3 containing oxides of Pr, La and Y, the HC purification rate was high at about 200 to 400° C. compared to that of the exhaust gas purification catalyst example 2 not containing these oxides. The catalytic activity in the above temperature range was improved by adding oxides of Pr, La and Y.

Durability Test 2

The durability test was carried out on the exhaust gas purification catalyst examples 4 to 9, and relationships between the amount of the ceria-zirconia composite oxide in the front part and the rear part of the lower layer (Pd layer) and the initial OSC amount and the OSC retention rate were examined from the comparison of the OSC amounts before and after durability. The exhaust gas purification catalyst examples 4 to 9 were each set in a V-type engine exhaust system with an engine displacement of 4 L, the engine was operated, and the durability test 2 was carried out at a catalyst temperature of 950° C. for 150 hours.

Figure 6:
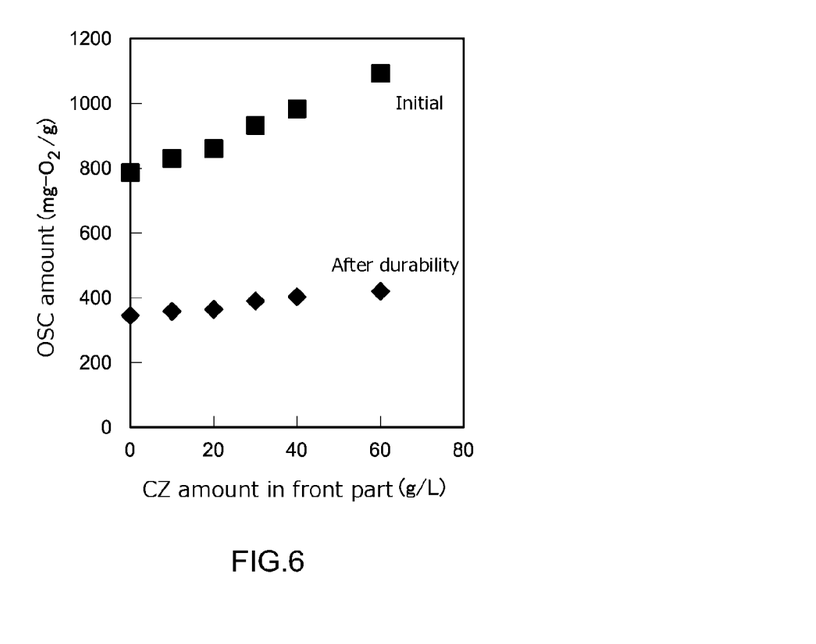
FIG. 6 is a graph showing a relationship between the amount of a ceria-zirconia composite oxide added in the front part and the OSC amount.
Figure 7:
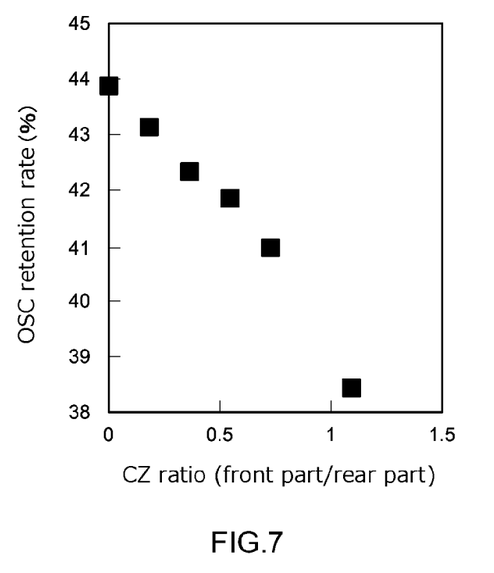
FIG. 7 is a graph showing a relationship between the proportion of a ceria-zirconia composite oxide added in each of the front part and rear part and the OSC retention rate.

As shown in FIG. 6, as the amount of the ceria-zirconia composite oxide included in the front part of the lower layer was reduced, the initial OSC was reduced. In addition, as shown in FIG. 7, as the proportion of the low specific surface area OSC material included in the front part of the lower layer was reduced, the OSC retention rate increased. When the low specific surface area OSC material included in the front part of the lower layer was smaller than the low specific surface area OSC material included in the rear part of the lower layer, the OSC retention rate was 40% or more.

Test of Warm up Characteristics

The test of warm up characteristics was carried out on the exhaust gas purification catalyst examples 4 to 9. An exhaust gas purification catalyst at room temperature was put in an engine exhaust system with an engine displacement of 2 L, 500° C. exhaust gas was introduced thereinto, and the time until the HC purification rate was above 50% (T50) was measured.

Figure 8:
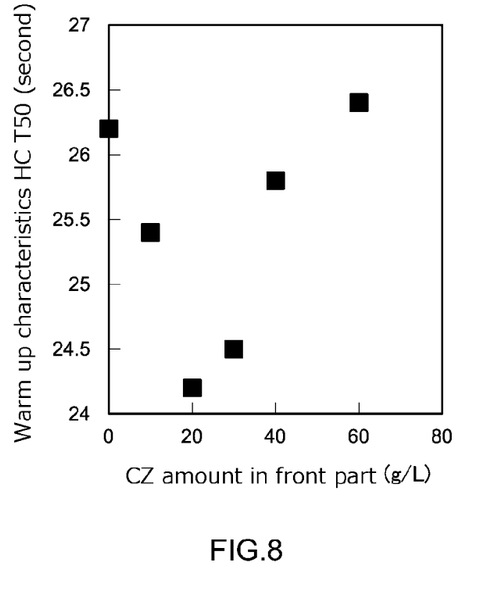
FIG. 8 is a graph showing a relationship between the amount of a ceria-zirconia composite oxide added in the front part and the warm up characteristics.

As shown in FIG. 8, it was verified that in a case where a ceria-zirconia composite oxide was not included in the front part of the lower layer (Example 4), and a case where the front part of the lower layer included the low specific surface area OSC material more than in the rear part of the lower layer (Example 9), T50 was above 26 seconds and warm up characteristics were not good.

It was verified from the results of the durability test 2 and the test of warm up characteristics that as the amount of the ceria-zirconia composite oxide included in the front part of the lower layer was reduced, the OSC retention rate increased, but it was not preferred that the ceria-zirconia composite oxide was not included at all from the viewpoint of warm up characteristics.

As described above, specific examples of the present invention were described. It should be noted, however, that these are merely illustrated as examples and do not limit the scope of claims. Various variants and modifications of specific examples described above are included in the techniques described in the scope of claims.

The invention claimed is:

1. An exhaust gas purification catalyst, which is placed in an exhaust channel of an internal combustion engine, and purifies exhaust gas emitted from the internal combustion engine, comprising:
    a substrate, and
    a catalyst coated layer formed on a surface of the substrate,
    wherein the catalyst coated layer contains an OSC material having an oxygen storage capacity,
    the catalyst coated layer includes an Rh layer mainly containing Rh as a catalyst metal, and a Pd/Pt layer mainly containing Pd and/or Pt as a catalyst metal, and
    at least a portion of the Pd/Pt layer in the catalyst coated layer contains, as the OSC material, a low specific surface area OSC material, including a ceria-zirconia composite oxide and having a specific surface area of 40 m$^2$/g or more and 60 m$^2$/g or less,
    wherein the catalyst coated layer includes a front part placed on an upstream side in an exhaust gas inflow direction, and a rear part placed on a downstream side,
    wherein the front part is formed from an end on an exhaust gas inflow side of the substrate towards an exhaust gas outflow side, and the rear part is formed from an end on an exhaust gas outflow side of the substrate towards an exhaust gas inflow side,
    wherein the front part and the rear part partly overlap with each other so that, when a total length of the substrate in an exhaust gas flow direction is $L_w$, a length $L_1$ of the front part meet $0.3 \times L_w \leq L_1 \leq 0.7 \times L_w$, a length $L_2$ of the rear part meet $0.5 \times L_w \leq L_2 \leq 0.85 \times L_w$, and $(L_1+L_2) \geq 1.05 \times L_w$ is met,
    wherein an amount of the low specific surface area OSC material (g/L) with respect to a capacity of the substrate (L) in the front part is 40 g/L or less, and
    wherein an amount of the low specific surface area OSC material (g/L) with respect to a capacity of the substrate (L) in the rear part is 1.2 times or more higher than the amount of the low specific surface area OSC material (g/L) in the front part.

2. The exhaust gas purification catalyst according to claim 1,
    wherein the catalyst coated layer includes a lower layer formed on the substrate, and an upper layer formed on the lower layer, and
    one layer of the upper layer and the lower layer constitutes the Rh layer and the other layer constitutes the Pd/Pt layer.

3. The exhaust gas purification catalyst according to claim 2, wherein the lower layer constitutes the Pd/Pt layer.

4. The exhaust gas purification catalyst according to claim 1,
    wherein the low specific surface area OSC material includes metallic elements described below in proportions described below as mole percentages:
    15% or more and 55% or less of Ce,
    40% or more and 80% or less of Zr,
    1% or more and 10% or less of Pr,
    0% or more and 10% or less of La, and
    0% or more and 10% or less of Y.

* * * * *